Patented Apr. 15, 1930

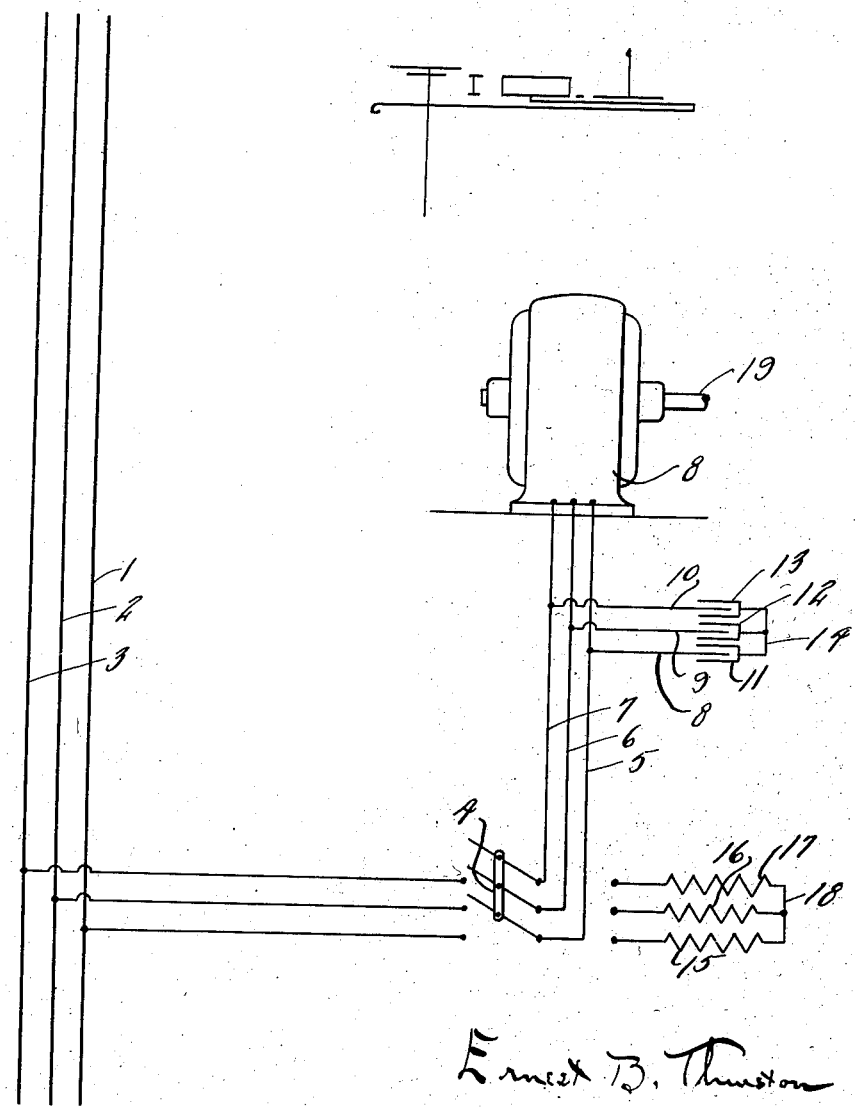

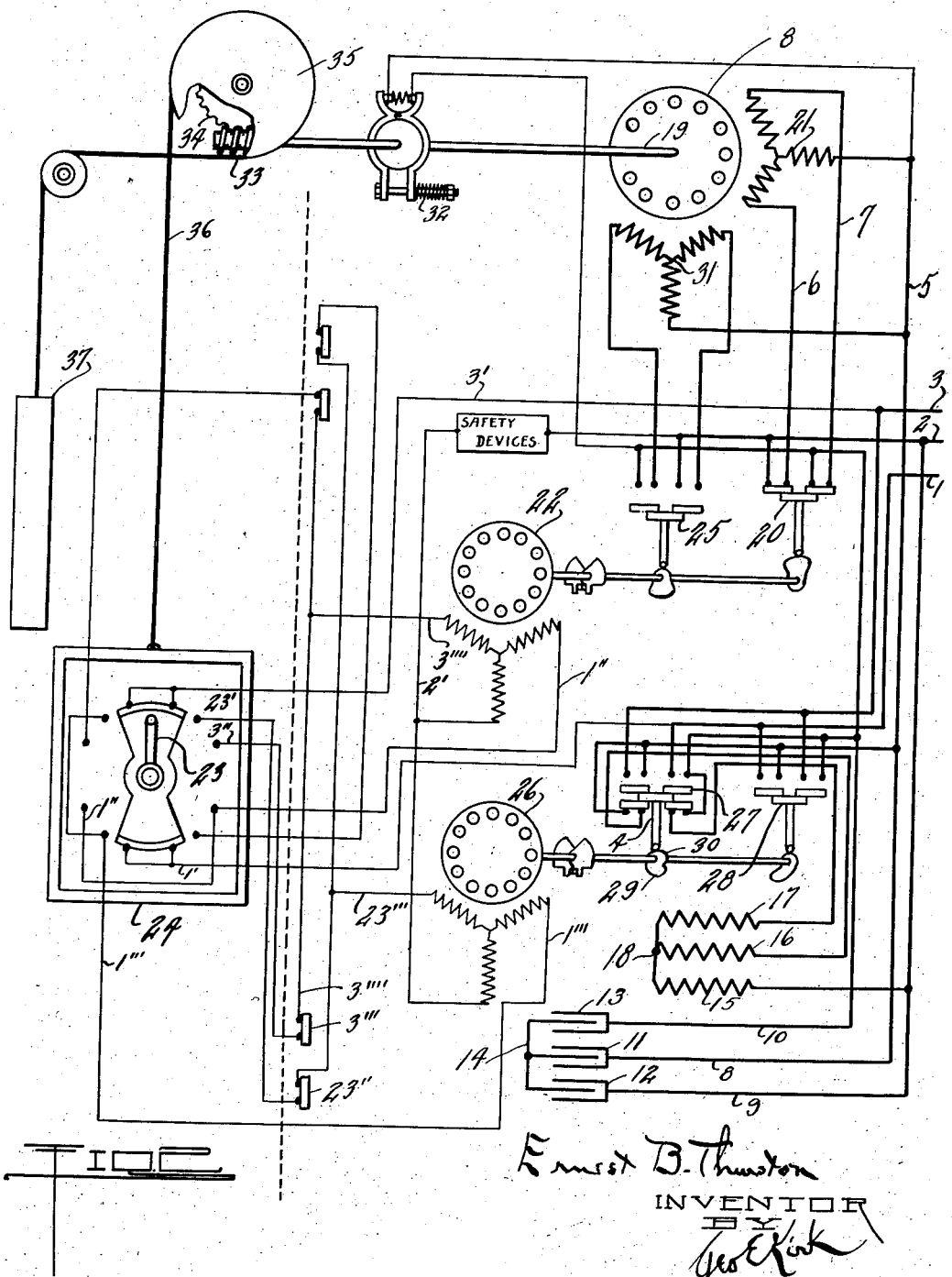

1,754,779

UNITED STATES PATENT OFFICE

ERNEST B. THURSTON, OF TOLEDO, OHIO, ASSIGNOR TO THE HAUGHTON ELEVATOR & MACHINE COMPANY, OF TOLEDO, OHIO, A CORPORATION OF OHIO

DYNAMO-ELECTRIC CONTROL SYSTEM

Application filed December 14, 1925. Serial No. 75,314.

This invention relates to dynamic braking and features of control as to power factor.

This invention has utility when incorporated in polyphase motors, as for hoisting in conjunction with dynamic brake stopping means therefor including a condenser and resistance.

Referring to the drawings:

Fig. 1 is a wiring diagram of a motor connected up for the braking and power factor control as herein disclosed; and Fig. 2 is a wiring diagram of a motor control installation for a multi-speed type of motor with the power factor and braking control.

Referring to the drawings, power supply lines 1, 2, 3, have branches extending to switch 4, and lines 5, 6, 7, to alternating current motor 8. These lines 5, 6, 7, are provided with branches 8, 9, 10, extending to condenser 11, 12, 13, provided with common terminal 14. The switch 4 in cutting out the motor 8 from the energy source as supplied by the lines 1, 2, 3, is thrown to cut in resistances 15, 16, 17, interconnected at common terminal 18.

In the operation of the motor 8, its shaft 19, running or under speed, has a momentum, which, upon the cutting out of the supply current may be effective as a generator. Such generator action of the motor 8 in alternating current operation tends to develop a current at 90° phase offset relatively to the pressure or voltage, thus providing quantities producing power which tend to return to as well as deliver power from such dynamo electric machine 8 normally used as a motor.

Accordingly, there is provided a condenser 11, 12, 13, effective as a kick-back current producer or exciter for bringing the power factor of the motor 8 up so that as the switch 4 is thrown to place the resistance 15, 16, 17, as a load upon the dynamo electric machine 8, for dynamic brake stopping of the shaft 19, the condenser means 11, 12, 13, coact for rendering such generator action of the machine 8 uniformly effective as to continuity for maintaining loading during the dynamic braking interval.

In power consuming equipment, especially such as operates under varying loads and in such hoisting operations as there may be a tendency to create not only great fluctuation and demand, but such demands as are widely varying from zero, as in elevator operation, there is a tendency for disturbing the power factor on the main current supply lines and thereby materially to detract from the efficiency of distribution.

In the showing in Fig. 2, condenser means 11, 12, 13, is provided with power supply lines 5, 6, 7, to the multi-speed motor 8 so that, as in the instance in Fig. 1, this condenser may coact for power factor correction when the dynamo electric machine 8, is operating as a motor, as well as when such motor is operating as a generator.

Low speed switch 20 is normally in for energizing low speed windings 21 for the motor 8, while operation of torque motor 22 from controller 23 on elevator car 24 may be effective by way of connection 3′, 23, 3″, 3‴, 3⁗; connections 1′, 23, 1″, and connection 2′, for operating the torque motor 22 and throwing in high speed switch 25, while said controller is also effective by way of connections 3′, 23, 23′, 23″, 23‴; connection 1′, 23, 1‴; and connection 2′, for operating torque motor 26 for opening switch 4 and throwing in selected up direction switch 27 or down direction switch 28. Cam 29 for operating the switches 4, 27, has in this instance as a part thereof instead of as a separate cam, section 30 effective for opening the switch 4 as the switch 28 is closed, notwithstanding the switch 27 is open. Accordingly, at any position of operation of the torque motor 26, the switch 4 is opened to cut out the loading resistance 15, 16, 17, but any operation of the controller 23 to cut off supply of power or energy source from the motor 19, effects at once not only an opening of the switch 27 or 28, which had been closed, but a simultaneous closing of the switch 4 to place the resistances 15, 16, 17, in direct connection with the motor 8 and in parallel with the condenser means as to the low speed windings 21 of said motor 8. When the motor 8 is operated at high speed, the windings 21 are not effective, but high speed windings 31 are operative. The condenser is in circuit, and as a current exciter is parallel with the low speed windings 21, as well as the high speed windings 31 at all operating conditions of the motor 8, while the condenser means is in parallel with the low speed winding 21 when the energy source is cut off and the dynamo electric machine 8 is operating as a generator with the resistances 15, 16, 17, as the load. The shaft 19 is held at rest by spring 32 at electromagnetic brake release. The shaft 19 through worm 33, worm wheel 34, and drum 35 actuates hoisting cable 36 between the car 24 and counterweight 37.

What is claimed and it is desired to secure by United States Letters Patent is:

1. In a motor control system, a polyphase alternating current motor, a condenser, a power line, a resistance, and means to connect the motor and condenser with the power line, or in parallel with the resistance.

2. In a motor control system, a multi-speed polyphase alternating current motor of the induction type having different circuits for different speeds, a condenser, a resistance, a power line, and means to connect the power line and condenser with any one of said circuits or to close one of said circuits through the resistance and condenser, said resistance and condenser being in parallel.

3. In a motor control system, the combination with a polyphase alternating current motor having a winding provided with a set of terminals, of dynamic braking means for said motor, said braking means comprising a resistance for each phase, means for connecting said resistance and winding upon the disconnection of said winding from a source of energy, and a static condenser for each phase permanently connected to said winding and parallel to the resistance, whereby said winding is excited by said condenser.

4. In a motor control system, the combination with a polyphase alternating current motor having two speed windings, each provided with a set of terminals, of dynamic braking means for said motor, said braking means comprising resistance, means for connecting said resistance with one of said windings upon the disconnection of the motor from a source of energy, and a condenser connected to the last mentioned winding and in parallel with the resistance.

5. In a motor control system, the combination with a polyphase alternating current motor having high and low speed windings, each provided with a set of terminals, of dynamic braking means for said motor, said braking means comprising resistance for the low speed winding, means for connecting said resistance and low speed winding upon the disconnection of said low speed winding from a source of energy, and a condenser connected to said low speed winding and in parallel with the resistance, whereby said low speed winding is excited by said condenser for power factor correction during normal operation of said winding and for dynamic braking when stopping.

6. In a motor control system, the combination with a polyphase alternating current motor having a winding, main and direction switches, and a motor line between the main and direction switches, of dynamic braking means for said motor, said braking means comprising a condenser permanently connected to the motor line and a resistance to be connected in parallel with said condenser from said motor by way of one of said switches, when the latter is thrown to disconnect the motor from the source of energy.

7. In a motor control system, the combination with a polyphase alternating current multi-speed motor having a winding, main and direction switches, of dynamic braking means for said motor, one of the main switches being normally closed, said braking means comprising a condenser and a resistance provided with connections placing said resistance in parallel with the condenser and in circuit with the motor upon opening of the direction switches.

8. In a motor control system, the combination with a polyphase alternating current motor having high and low speed windings, high speed main, low speed main and direction switches with a normally closed contact; of dynamic braking means for said motor, said braking means comprising a condenser and a resistance provided with connections placing said resistance in parallel with the condenser and in circuit with a low speed motor winding through said low speed main switch and said normally closed contact of the direction switches.

In witness whereof I affix my signature.

ERNEST B. THURSTON.